United States Patent [19]
Satoh et al.

[11] Patent Number: 5,092,460
[45] Date of Patent: Mar. 3, 1992

[54] METHOD OF AND APPARATUS FOR FASTENING A FASTENING MEMBER

[75] Inventors: Osamu Satoh, Yokohama; Sachio Umetu, Kawasaki; Mitsuo Arai, Chichibu, all of Japan

[73] Assignee: Canon Kabushiki Kaisha, Tokyo, Japan

[21] Appl. No.: 314,101

[22] Filed: Feb. 23, 1989

[30] Foreign Application Priority Data

| Feb. 29, 1988 | [JP] | Japan | 63-02491[U] |
| Feb. 6, 1989 | [JP] | Japan | 1-12743 |
| Feb. 6, 1989 | [JP] | Japan | 1-27035 |
| Feb. 6, 1989 | [JP] | Japan | 1-27036 |
| Feb. 7, 1989 | [JP] | Japan | 1-27037 |

[51] Int. Cl.$^5$ .................................... B65D 85/24
[52] U.S. Cl. .................. 206/347; 206/345; 81/434; 81/433
[58] Field of Search ........... 81/434; 221/71–74; 206/338, 344, 345, 347, 346

[56] References Cited

U.S. PATENT DOCUMENTS

| 3,382,744 | 5/1968 | Jones | 81/54 |
| 3,489,041 | 1/1970 | Hauenstein et al. | 81/125 X |
| 3,747,747 | 7/1973 | Skinner | 206/344 |
| 4,060,113 | 11/1977 | Matsushima | 81/125 |
| 4,165,660 | 8/1979 | Behrens | 81/55 |
| 4,553,454 | 11/1985 | Laskey | 81/125 |
| 4,762,030 | 8/1988 | Nguyen | 81/55 |
| 4,836,062 | 6/1989 | La Torre | 81/55 |

FOREIGN PATENT DOCUMENTS

| 48-44898 | 12/1973 | Japan . |
| 48-44899 | 12/1973 | Japan . |
| 49-6415 | 2/1974 | Japan . |
| 49-14517 | 4/1974 | Japan . |
| 49-14518 | 4/1974 | Japan . |
| 50-23913 | 7/1975 | Japan . |
| 51-2672 | 1/1976 | Japan . |
| 60-48855 | 3/1985 | Japan . |
| 60-71414 | 4/1985 | Japan . |
| 60-48311 | 12/1985 | Japan . |
| 63-167107 | 7/1988 | Japan . |

*Primary Examiner*—D. S. Meislin
*Attorney, Agent, or Firm*—Fitzpatrick, Cella, Harper & Scinto

[57] ABSTRACT

A fastening apparatus uses fastening members such as screws held on a tape and supplied to the fastening position of a bit. The fastening members are separated from the tape by the bit after the posture of the tape is held in a predetermined state, whereby the fastening apparatus can keep a posture for the fastening operation even after the fastening members are separated from the tape.

4 Claims, 11 Drawing Sheets

FIG.12A  FIG.12B
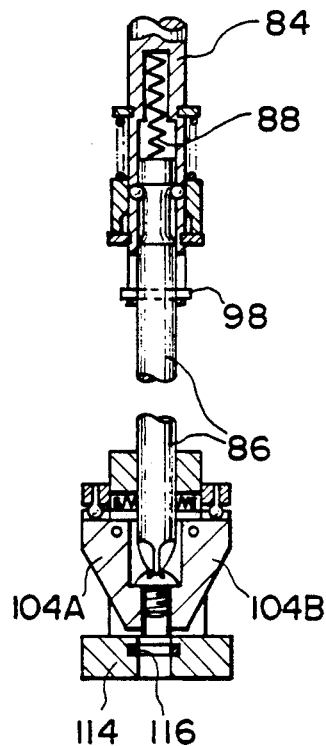
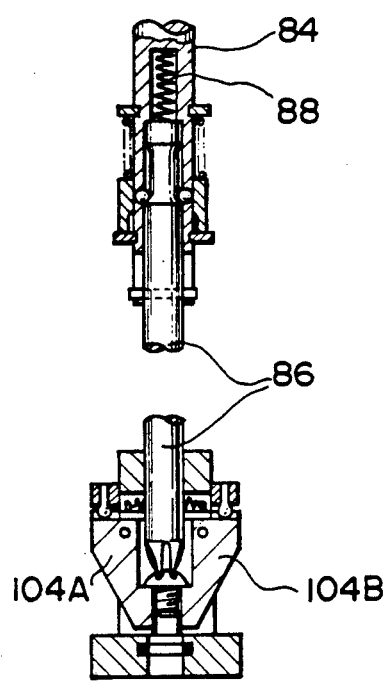
FIG.12C  FIG.12D  FIG.12E
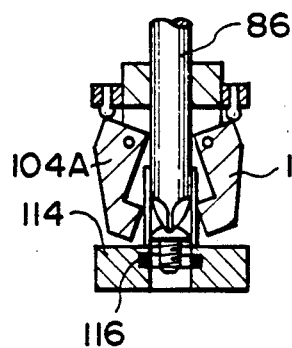
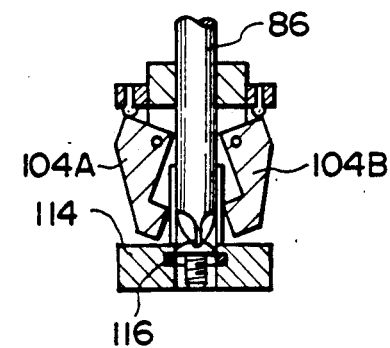
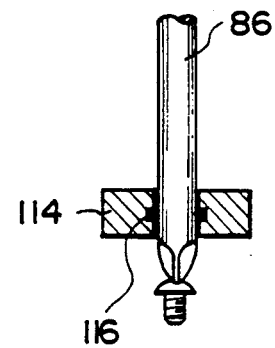

METHOD OF AND APPARATUS FOR FASTENING A FASTENING MEMBER

BACKGROUND OF THE INVENTION

1. Field of the Invention

This invention relates to a method of and an apparatus for fastening a fastening member such as a screw or the like.

2. Related Background Art

When a part or a unit is to be fastened by a fastening member, rotation is imparted to a bit and the bit is brought into meshing engagement with a screw and the screw is fastened by rotation and downward movement of the screw.

As methods of supplying screws to a bit, there are methods of holding screws on a long tape or film and supplying them as disclosed in Japanese Utility Model Publication No. 50-23913 (U.S. Pat. No. 3,442,374), Japanese Patent Publication No. 48-44899, Japanese Patent Publication No. 49-14517, Japanese Patent Publication No. 49-14518 and Japanese Patent Publication No. 512672.

Also, there are methods for holding fastening members such as screws on a tape, and winding the tape into the form of a roll in a containing member such as a magazine or a cassette and drawing the tape out of the magazine or cassette as required to thereby supply the screws to a bit. The methods are disclosed in Japanese Laid-Open Patent Application No. 60-48855, Japanese Patent Publication No. 49-6415 (U.S. Pat. No. 3,688,966) and Japanese Patent Publication No. 60-48311. In Japanese Patent Publication No. 48-44898, there is shown an apparatus wherein nails are held in a row on a tape and the tape is contained in a magazine and the nails held on the tape are separated by a driving rod and are driven in. Similar techniques are disclosed in Japanese Laid-Open Patent Application No. 60-71414 and Japanese Laid-Open Patent Application No. 63-167107.

There are known many techniques wherein screws are held on a tape and supplied to a bit, as described above.

Where the tape is supplied to a screwing machine or a magazine containing the tape therein is mounted and the tape is drawn out of the magazine and the screws held on the tape are supplied to a bit and screwing is effected by the bit, the screws must be separated from the tape, but if the posture of the tape is unstable, the mesh coupling between the screw on the tape and the bit will not be conveniently accomplished, thus resulting in an unsatisfactory assembly.

Also, as a form of the supply of the tape, there is one as shown in the aforementioned Japanese Laid-Open Patent Application No. 60-71414 wherein screws are held so that the shank portions of the screws are positioned vertically relative to the plane of the tape or film.

Further, to separate the screws on the tape from the tape by downward movement of the bit, it is required to move the bit downwardly with a force which opposes the screw-holding force of the tape, and in some cases, the screws spring out by this force of the bit.

SUMMARY OF THE INVENTION

It is an object to provide a fastening method whereby fastening members such as screws held on a tape are supplied to a bit and the separation of the fastening members from the tape and the meshing engagement of the fastening members with the bit can be smoothly accomplished by the bit and an accurate fastening operation can be accomplished.

It is a further object of the present invention to provide a fastening method whereby, in a case where adoption of a supply method is made, wherein a tape holding screws with the shanks of the screws facing perpendicularly to the direction of feed of the tape is fed to a bit and the screws are separated from the tape by downward movement of the bit, screwing operation can be accomplished with the posture of the tape kept unchanged during the separation of the screws.

It is still a further object of the present invention to provide a fastening method in which posture keeping means is provided for keeping the posture of the tape in a predetermined state and the tape is fed during the returning step of the bit after the screwing operation by the bit, whereby the period of the screw supply by the tape and the operation of the bit can be shortened, thus resulting in good efficiency.

Where screws are held on a tape and the screws are fastened to an assembly part by rotation and downward movement of a bit, it is necessary that the feeding of the tape and the movement of the bit be effected while timing is time-serially taken therebetween.

Although it is also possible to construct tape feeding means and bit driving means individually, the tape feeding means and the bit driving means can be operatively associated with each other to thereby make the construction of a fastening apparatus clear. It is an object of the present invention to propose an apparatus in which the tape feeding means and the bit driving means are not individually operated, but the tape is fed in accordance with the upward movement of the bit after the completion of the screw fastening operation by the downward movement of the bit and the next screw is conveyed to the position of the bit.

It is a further object of the present invention to provide a supply method whereby, when a plurality of fastening parts such as screws are continuously held on a supply unit such as a tape or a film and are supplied to a fastening machine and the screws on the tape or the film are separated therefrom by the bit of the fastening machine and screwing operation is effected, the lack of a screw on the tape or the film is detected and the tape or the film is continuously fed until the next screw comes to the screwing position of the bit, thereby preventing wasted time in the screwing operation.

BRIEF DESCRIPTION OF THE DRAWINGS

FIGS. 12A, 12B, 12C, 12D and 12E illustrate the operating state of a bit.

DESCRIPTION OF THE PREFERRED EMBODIMENTS (1) A method of supplying fastening members such as screws by means of a tape An embodiment of an article supply unit according to the present invention will hereinafter be described in detail with respect to a case where it is applied to a screw supply tape with reference to the accompanying drawings.

Figure 1:
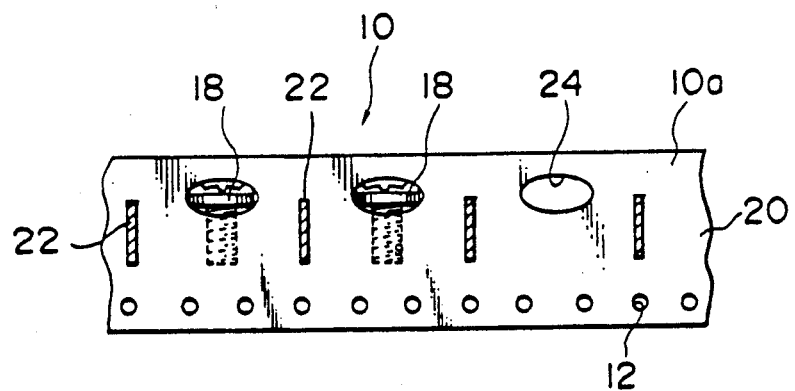
FIG. 1 is a front view showing the construction of an embodiment of an article supply unit according to the present invention.

FIG. 1 shows the construction of a screw supply tape 10. As shown, this screw supply tape 10 is provided with a tape body 10a constructed of a pair of strips 20 formed of a flexible material, for example, synthetic resin such as vinyl chloride resin, or paper and superposed one upon the other.

In one side edge portion of the tape body 10a, a number of sprocket apertures 12 are formed at equal intervals along the direction of extension of the tape 10. These sprocket apertures 12 are provided to be engaged by a sprocket 50 provided in a screwing machine 14 which will be described later and convey the tape 10 in response to rotation of the sprocket 50.

The strips 20 are partially secured (thermally adhered) to each other at securing portions 22 formed at equal intervals along the direction of extension of the tape 10. The interval between adjacent securing portions is set to a value appropriate for a screw 18 which will be described later to be inserted therebetween.

Openings 24 are formed in the strips 20 at substantially central positions between adjacent securing portions 22. These openings 24 are set so that the pair of strips 20 substantially overlap each other while being in intimate contact with each other. Further, each opening 24 is set to a size in which the side of the head 18a of the screw 18 to be described is fitted.

Each opening 24 is formed into a substantially elliptical shape. More particularly, the shape of the lower half of each opening 24 is pinched inwardly because of the adhered securing portions 22 so as to be gradually inclined toward the center of the screw receiving hole 16. That is, with the head 18a of the screw 18 fitted in each opening 24, the lower edge portion of the opening 24 forms a tapered screw receiving hole 16 and engages the lower surface of the head 18a.

On the other hand, in the above-described tape body 10a, screw receiving holes 16 into which the screws 18 are inserted are defined by the space encircled by the portions of the strips 20 which are located between adjacent securing portions 22. The screws 18 as shaft members with heads prescribed as articles may be inserted into these screw receiving holes 16 and supported by the tape 20.

Figure 2:
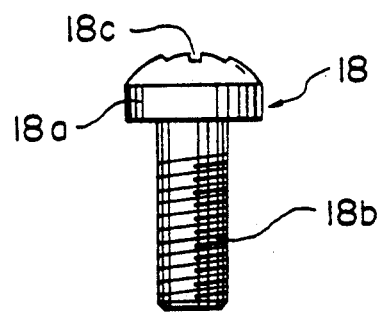
FIG. 2 is a front view showing the shape of a screw applied as an article.

The screw 18, as shown in FIG. 2, is comprised of a head 18a and a screw body 18b integrally connected to the head 18a. The head 18a is formed so as to have a first diameter which is set to a diameter larger than a second diameter of the screw body 18b (the outer diameter of the thread).

Figure 3:
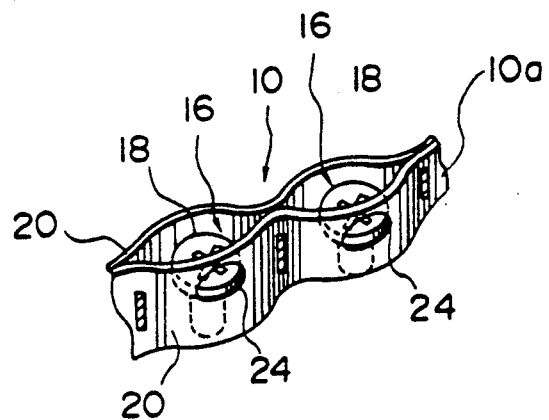
FIG. 3 is a perspective view showing a screw supply tape with screws supported thereon.

The screw supply tape 10 is formed as described above and therefore, in order to insert the screws 18 into the tape 10 as shown in FIG. 3, that portion of the pair of strips 20 which defines the screw receiving hole 16 into which the screw is to be inserted is pushed to open, the screw receiving hole 16 substantially closed due to the rigidity of the strips 20 is made larger in diameter than the diameter of the head 18a of the screw 18, and the screw 18 is pushed into the screw receiving hole 16 thus enlarged in diameter.

Thus, with the screw 18 inserted in each screw receiving hole 16, the head 18a of the screw 18 is supported with its opposite sides fitted in the opening 24 formed in the corresponding portion of the strips 20. That is, with the sides of the head 18a of the screw 18 fitted in the opening 24, said portion of the strips 20 is deformed in a direction to decrease the diameter of the screw receiving hole 16 on the basis of its own rigidity, and the lower surface of the head 18a of the screw 18 is supported by being restrained on the tapered lower edge of the opening 24.

As a result, in the natural state, in other words, in a state in which no external force acts on the screw 18, the extraction of the screw in the vertical direction from the tape 10, in other words, from the screw receiving hole 16, is reliably prevented and thus, the screw 18 continues to be well supported by the tape 10.

The rigidity of such a tape 10 is relatively small. Thus, as will be described later, in the screwing machine 14, a bit approaches from above so as to extend through the screw receiving hole 16 formed in the tape 10 and fits into a cruciform hole formed in the head 18a of the screw 18 inserted therein, and the bit further lowers to push down the screw 18.

The lower edge of the opening 24 which is engaged by the rounded lower surface of the head 18a of the screw 18 is formed into a tapered shape. As a result, in response to the screw 18 being pushed down, the central portion of the strips 20 is gradually pushed outwardly, and in this manner, the diameter of the screw receiving hole 16 is brought into a state in which it is made larger than the diameter of the head 18a of the screw 18. As a result, the screw 18 passes through the screw receiving hole 16 and is taken out of the tape 10.

Figure 4:
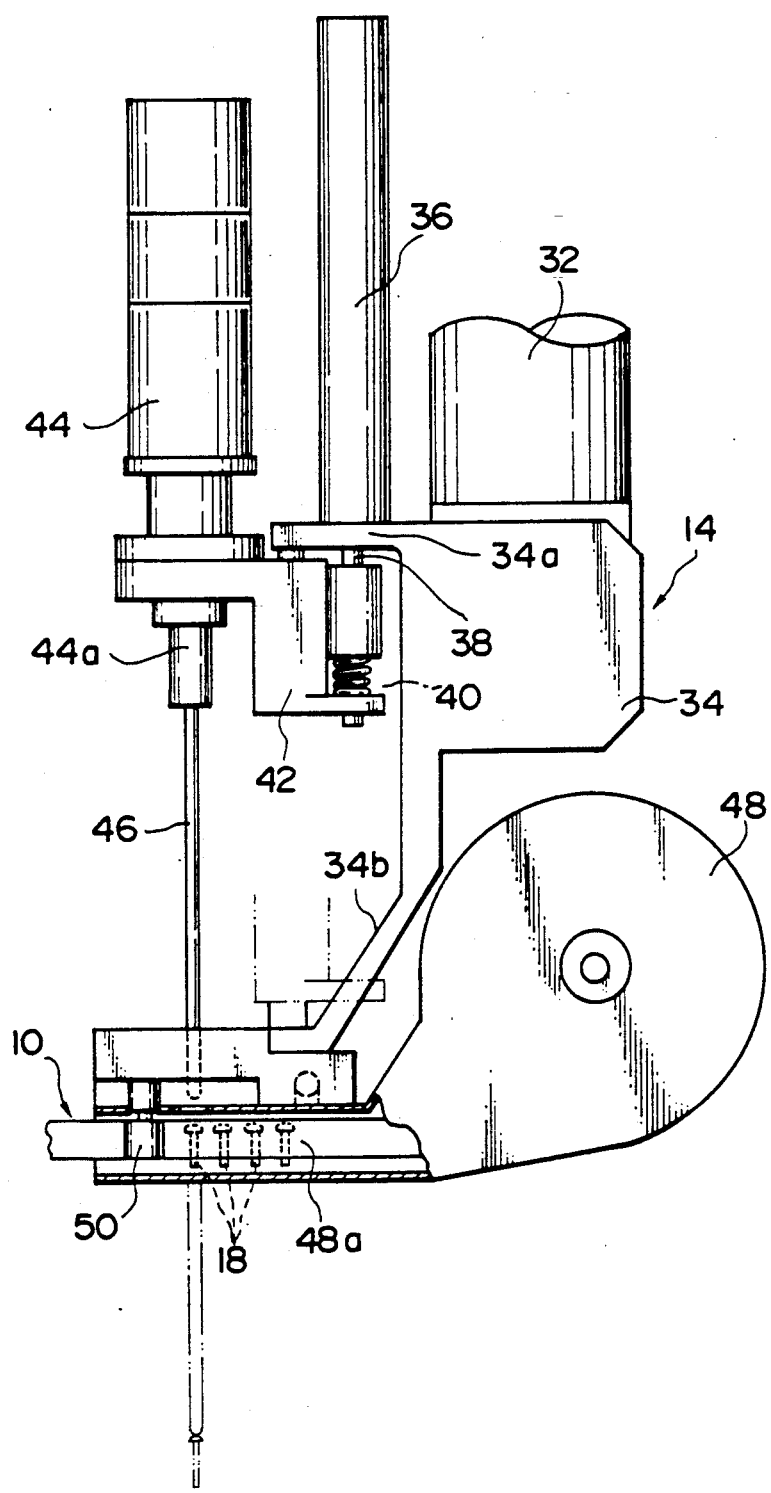
FIG. 4 is a front view schematically showing the construction of a screwing machine in which the screw supply tape is used.

With reference to FIG. 4, the construction of the screwing machine 14 for taking the screw 18 supported by the screw supply tape 10 constructed as described above out of the screw supply tape 10 and screwing it to a work is described as follows.

This screwing machine 14 is removably mounted for use on the fore end of the robot arm 32 of an automatic assembling apparatus, not shown, and is provided with a mounting body 34 removably mounted on the fore end of the robot arm 32. This mounting body 34 is integrally provided with a substantially horizontally extending first mounting stage 34a and a substantially obliquely downwardly extending second mounting stage 34b.

An air cylinder 36 for driving the bit vertically which extends in a vertical direction is fixed to the first mounting stage 34a. A piston 38 downwardly extending through the first mounting stage 34a is further downwardly extendably provided on the air cylinder 36. A platform 42 having a resilient buffer allowance in a vertical direction is mounted on the lower end of the piston 38 through a spring 40 for buffer during positioning.

A DC servo-motor 44 for rotatively driving a bit is secured to the upper surface of the platform 42. The drive shaft 44a of this motor 44 downwardly extends through the platform 42, and a bit 46 extending along a vertical direction is integrally connected to the lower end of the drive shaft 44a. The bit 46 is constructed so as to fit from above into a cruciform hole 18c formed in the head 18a of the aforedescribed screw 18, and is formed of a magnetized metal.

The driving system for the bit 46 is constructed as described above and thus, by the motor 44 being started, the bit 46 is rotatively driven, and by compressed air being supplied to the air cylinder 36, the bit 46 is lowered to a screwed position relative to the work through a screw taking-out position prescribed below the bit.

On the other hand, the aforedescribed screw supply tape 10 is wound about a horizontal axis and contained in a cartridge 48 with the screws 18 being inserted in the respective screw receiving holes 16 and supported in the openings 24. One end of the screw supply tape 10 is twisted by about 90° in the course and made vertical, and thereafter is taken outwardly through a tape taking-out port 48a formed in the cartridge 48. This cartridge 48 has its tape taking-out port 48a removably mounted on the lower portion of the second mounting stage 34b of the mounting body 34.

With the cartridge 48 thus mounted on the second mounting stage 34b of the mounting body 34, the end of the screw supply tape 10 is taken out forwardly (leftwardly as viewed in FIG. 4).

On the other hand, a sprocket 50 for conveying the tape is rotatably disposed forwardly of the end of the second mounting stage 34b, i.e., the vertically moved position of the bit 46. This sprocket 50 is designed to be rotatively driven by a drive motor, not shown, which is contained in the second mounting stage 34b. The end portion of the tape 10 taken out of the cartridge 48 is connected to the sprocket 50 by the teeth of the sprocket 50 being engaged with the sprocket apertures 12 formed in the tape.

The conveying and driving system for the tape 10 is constructed as described above and thus, in response to the intermittent rotative driving of the sprocket 50, the tape 10 is intermittently fed so that the screws 18 supported thereon are successively controlled to the screw taking-out position defined below the bit 46.

The screwing operation of the screwing machine 14 constructed as described above will hereinafter be described.

First, as described above, the cartridge 48 in which the screw supply tape 10 on which the screws 18 are supported is contained is mounted on the second mounting stage 34b of the mounting body 34, and the fore end of the tape 10 is taken out of the taking-out port 48a of the cartridge 48, and the thus taken-out fore end of the tape 10 is engaged with the sprocket 50, whereby the preparatory operation is completed.

Thereafter, when the robot arm 32 of the automatic assembling apparatus is moved rightward above the work to be screwed, the screwing operation is started. That is, as soon as compressed air is supplied to the air cylinder 36 and the piston 48 is lowered, the DC servo-motor 44 is started and the bit 46 is lowered while being rotated. When the lower end of the bit 46 is inserted from above into the screw receiving hole 16 and is lowered to the screw taking-out position, it fits into the cruciform hole 18c formed in the head 18a of the screw 18, and this screw is downwardly removed from the tape 10 on the basis of the aforedescribed operation while being rotated.

As previously described, the bit 46 is magnetized and therefore, the screw 18 removed below the tape 10 is attracted to the bit 46 by the magnetic force thereof and may not fall downwardly.

By the rotation of the bit 46, the screw 18 is also rotated and is further lowered in conformity with the lowering of the bit 46, and is brought to the screwing position for the work. That is, in this screwing position, the work is formed with a screw hole (not shown) into which the screw 18 is screwed, and the rotating screw 18 is inserted into this screw hole, whereby the screw 18 is threadably engaged with the work.

Thereafter, when the complete threadable engagement of the screw 18 with the screw hole is detected by a variation in the load of the motor 44, the supply of compressed air to the air cylinder 36 is stopped, and the piston 38 is elevated by the repulsion of a return spring (not shown) provided therein. That is, the bit 46 separates from the screw 18 threadably engaged with the work and is moved upward, and is thus brought to the upper standby position. In this manner, a series of screwing operations of a screw 18 is completed.

As described above in detail, in this embodiment, the screw supply tape 10 of the above-described construction is used and therefore, as long as an extraneous force does not act on the screw 18, the screw 18 continues to be well supported on this tape 10, and when the screw 18 is to be removed from the tape 10 through the intermediary of the bit 46, the removal resistance is very small and thus, simply by applying a predetermined force to the screw 18, the screw 18 is removed easily and reliably from the tape 10.

Also, in this embodiment, the head 18a of the screw 18 is supported while being restrained on the lower edge of the opening 24 in the tape 10 and thus, the vertical position thereof is accurately prescribed. As a result, the control of the downward stroke amount of the bit 46 is executed very simply.

Further, in this embodiment, the tape 10 is broken in no way when the screw 18 is removed from the tape 10 and therefore, this tape 10 can be reused, and this is very economical.

The present invention is not restricted to the construction of the above-described embodiment, but of course, various modifications thereof are possible without departing from the gist of the present invention.

For example, in this embodiment, a screw is adopted as an article and description has been made of the mounting of the screw, whereas this is not restrictive, but the article may be any shaft member with a head such as a bolt or a rivet.

Figure 5:
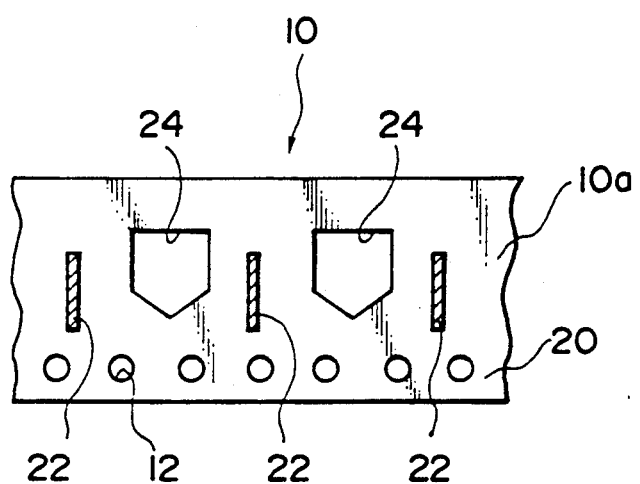
FIG. 5 is a front view showing the construction of a modification of the article supply unit according to the present invention.

Also, in the above-described embodiment, the shape of the openings 24 has been described as substantially elliptical, but for example, as shown as a modification in FIG. 5, the openings may be formed in the shape of the so-called home base. In short, the openings may be formed in any shape in which the lower half thereof is gradually inclined toward the lower portion thereof.

As described above in detail, the article supply unit according to the present embodiment for holding an article and conveying it to a supplied position is characterized in that said article is a shaft member with a head provided with a shaft body and a head integrally connected to the shaft body, and the article supply unit is provided with a tape body comprised of a pair of strips formed of a flexible material and superposed one upon the other, a plurality of securing portions formed at predetermined intervals along the direction of conveyance of said supply unit for partially securing the superposed portions of said strips to each other, and openings formed between adjacent securing portions in said strips and into which the sides of the heads of shaft members with heads held between the strips partially fit. Thus, according to the present invention, there is provided an article supply unit which can continuously supply a number of articles and can simply remove the articles conveyed and which enables the tape to be reused and which is improved in economy.

Also, said openings are characterized in that they are set to the same height. Thus, according to the present invention, there is provided an article supply unit which can continuously supply a number of articles and can simply and reliably remove the articles conveyed and which enables the tape to be reused and which is improved in economy.

Further, each of said openings is characterized in that the shape of the lower half thereof is formed so as to be gradually inclined. Thus, according to the present invention, there is provided an article supply unit which can continuously supply a number of articles and can simply and reliably remove the articles conveyed and which enables the tape to be reused and which is improved in economy.

Also, each of said openings is characterized in that it is formed in a substantially elliptical shape. Thus, according to the present invention, there is provided an article supply unit which can continuously supply a number of articles and can simply and reliably remove the articles conveyed and which enables the tape to be reused and which is improved in economy.

(2) Description of another fastening apparatus

FIGS. 6 to 12 show a screwing apparatus for fastening screws held on the tape shown in FIG. 3. In these FIGURES, the reference numeral 50 designates a tape cassette containing therein tape holding screws thereon. This cassette 50 is removably mounted on the frame 52 of the screwing apparatus by means of a nut 54. The frame 52 comprises a vertical portion 52A, a lower horizontal portion 52B and an upper horizontal portion 52C.

The reference numeral 54 denotes an air cylinder unit mounted on the upper horizontal portion 52C. The piston rod 54A of the cylinder unit 54 is fitted in a hole 56A formed in a motor base plate 56, which is fixed to the piston rod by means of a nut 54B. The reference numeral 58 designates a spring member for biasing the motor base plate 56 toward the lower end of the piston rod 54A.

The reference numeral 60 denotes a crank lever having one end 60A thereof rotatably supported on the vertical portion 52A of the frame and having a can follower 60B mounted on the other end thereof. The cam follower 60B is in engagement with the right upper end of the motor base plate 56, as viewed in FIG. 6. One end of each of two wires 62 and 64 is fixed to the crank lever 60.

The reference numeral 66 designates an outer cable mounting member mounted on the vertical portion 52A of the frame. The outer cable mounting member 66 holds the upper ends of outer cables 68 and 70 into which the wires 62 and 64 are inserted. The other ends of the outer cables 68 and 70 are fixed to a lever 72 and a bracket 74 which will be described later, and the other end of the wire 62 extending out from the other end of the outer cable 68 is fixed to a tape guide member 76A on the lower surface of a frame member 76. The other end of the wire 64 extending out from the other end of the other outer cable is wound and held on a groove in a pulley 78 which will be described later.

The reference numeral 80 designates a guide member for the base plate 56 mounted on the vertical frame 52A.

$M_1$ denotes a motor for rotating the bit (driven). The motor $M_1$ is mounted on the base plate 56 through brackets 82A, 82B and 82C.

Figure 7:
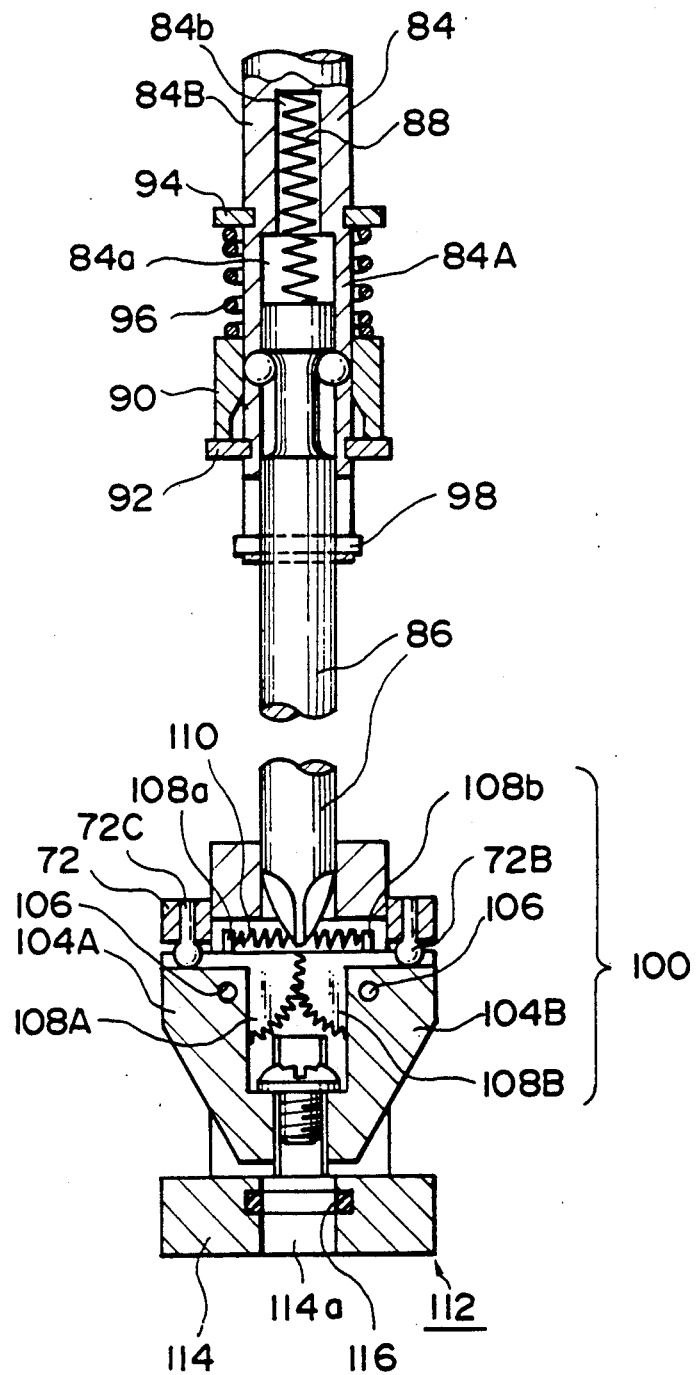
FIG. 7 is a cross-sectional view taken along line A—A of FIG. 6.

The reference numeral 84 designates the rotary shaft of the motor $M_1$. The rotary shaft 84 comprises a diameter portion 84A having a large-diameter bore 84$a$ (FIG. 7) and a diameter portion 84B having a small-diameter bore 84$b$ (FIG. 7). The reference numeral 86 denotes a bit for imparting rotation to a screw on the tape. The bit 86 is of a shape in which one end of the shaft portion thereof fits in the large-diameter bore 84$a$ of the rotary shaft 84 and the other end is engaged with a cruciform or cross groove in the head of the screw.

The reference numeral 88 designates a spring inserted in the small-diameter bore 84$b$ of the rotary shaft 84 for producing a reaction force between the rotary shaft and the bit.

The reference numeral 90 denotes a cylinder member fitted to the outer periphery of the diameter portion 84A of the rotary shaft 84. The lower end of this cylinder member 90 bears against a snap ring 92 studded on the diameter portion 84A, and the upper end is given a biasing force by a spring 96 extended between it and a snap ring 94 and a ball is urged against the bit by the cylinder member 90. The reference numeral 98 designates a pin extending through the bit 86 and the rotary shaft 84. A vertical groove 84C is formed in the diameter portion 84A at the lower end of the rotary shaft 84 into which the bit is fitted.

The construction of clamp means 100 for the tape will now be described. The reference character 76A denotes a tape guide member mounted on the lower surface of the frame member 76. The tape guide member 76A is formed centrally thereof with a tape movement groove in which the tape drawn out of the cassette 50 moves, and the tape drawn out from the tape drawn out port of the tape cassette 50 is drawn out through this tape movement groove. The lever 72 is pivotally supported on a protruded portion 76B provided on the frame member 76 by a shaft 72A, and one end thereof is biased in the direction of arrow A by a spring 102 extended between it and the frame 76A.

Figure 8:
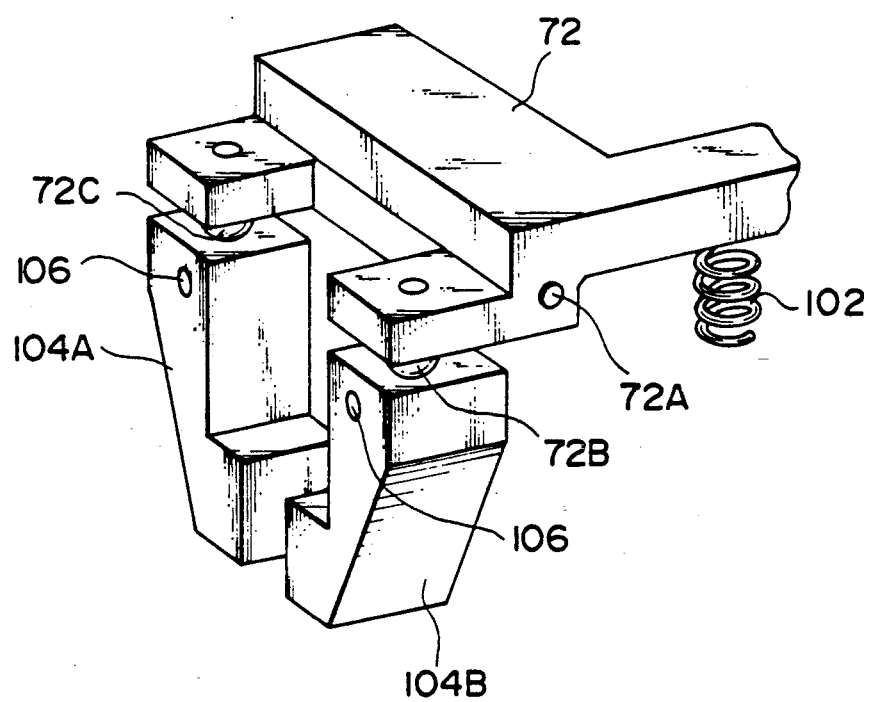
FIG. 8 shows the constructions of a lever 72 and clamp members 104A and 104B.

The other end of the lever 72 is bifurcated as shown in FIG. 8, and pins 72B and 72C are studded on the branching-off portion of the lever 72. The reference characters 104A and 104B designate clamp levers for posture holding for holding the tape vertically on the axis of movement of the lowering movement of the bit. The clamp levers 104A and 104B are pivotably supported on the end surface of the frame 76 by pivot pins and 106.

The reference characters 108A and 108B denote spur gears supported on the pivot pins 106 and meshing with each other. The spur gears 108A and 108B are fixed to the clamp levers 104A and 104B, and the upper portion of each of the spur gears 108A and 108B is partly cut away flatly, and pins 108$a$ and 108$b$ are studded on the flat portions, and a spring 110 is extended between these pins. This spring 110 is provided so that a contracting force may act, and the clamp levers 104A and 104B are normally biased in a direction to be opened by the spring force of this spring. The reference numeral 112 designates catcher means. The catcher means 112 comprises a screw insertion member 114 mounted on the lower surface of the frame member 76 and formed with a screw insertion hole 114a, and a screw receiving member 116 contained in the level difference portion of the inner diameter of the screw insertion hole 114a and formed of a ring-like resilient material.

Figure 9:
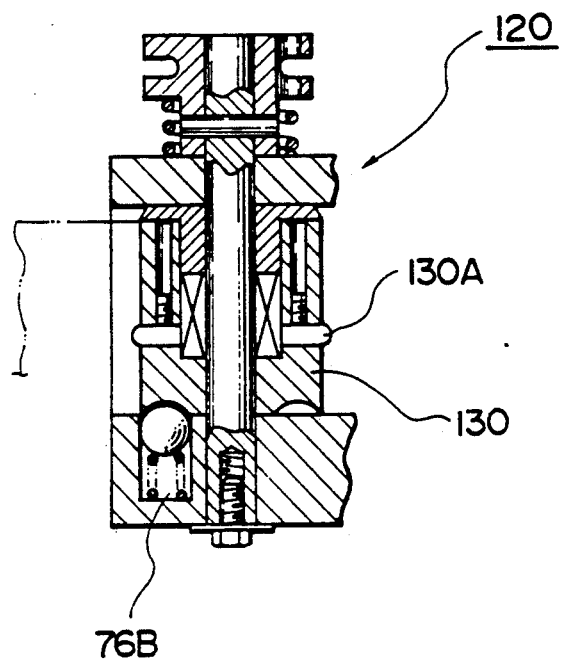
FIG. 9 is a cross-sectional view showing the construction of tape feeding means 120 and taken along line B—B of FIG. 6.
Figure 10:
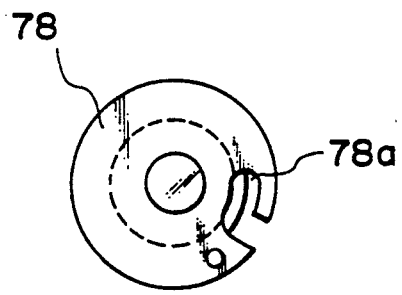
FIG. 10 is a plan view of a pulley 78.

The reference numeral 120 in FIG. 9 denotes tape feeding means. The tape feeding means 120 will hereinafter be described with reference to FIGS. 9 and 10 as well as FIG. 6. The reference numeral 122 designates a shaft supporting said frame 76 and extending through said bracket 74 and having a pulley 78 mounted at the upper end thereof. As previously described, the wire 64 is wound on the groove portion of the pulley 78, and one end of the wire is restrained on the cut-away portion 78a of the pulley 78 shown in FIG. 10. A pulley returning coil spring 124 is extended with its opposite ends attached to the pulley 78 and the bracket 74.

The reference numeral 126 denotes a pin for fixing the pulley 78 to the shaft 122. The reference numeral 128 designates a one-way clutch mounted on the shaft 122, the reference numeral 130 denotes a sprocket mounted on the outer periphery of the one-way clutch 128, and the reference character 130A designates a sprocket pin attached to the sprocket. The reference numeral 132 denotes a sprocket return preventing ball contained in a hole 76B formed in the frame 76 and biased by a spring 134. The ball 132 is restrained in a groove formed in the lower surface of the sprocket 130.

Figure 11:
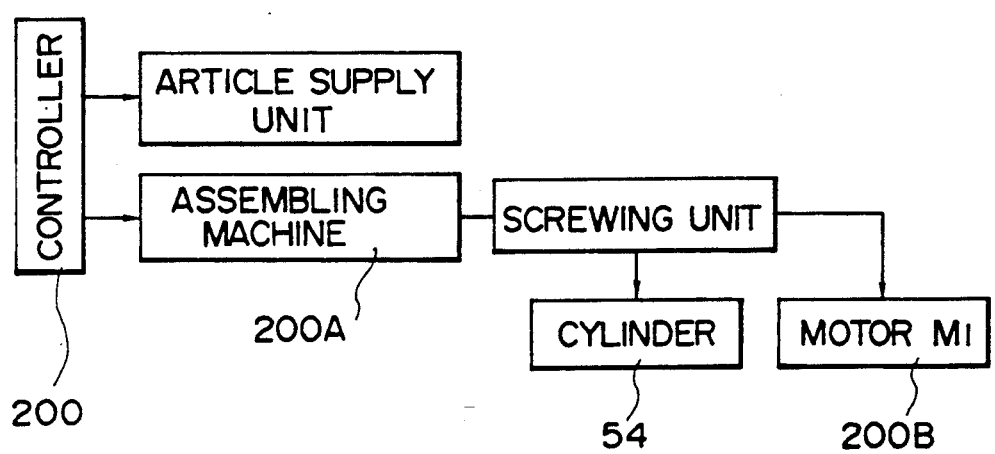
FIG. 11 is a block diagram of the control operation.

The operation of the present apparatus will now be described with reference to FIG. 11. The present screwing apparatus is incorporated into the assembly system of an automatic machine such as an assembling machine and is operated in operative association with an assembling machine, not shown, whereby it can enhance productivity. The assembly system outputs a command to each unit constituting the system including as assembling machine 200A by a central controller 200. Again in the present screwing apparatus, tape feeding is effected by a command from the controller 200.

(a) Operation of holding the posture of the tape

Figure 6:
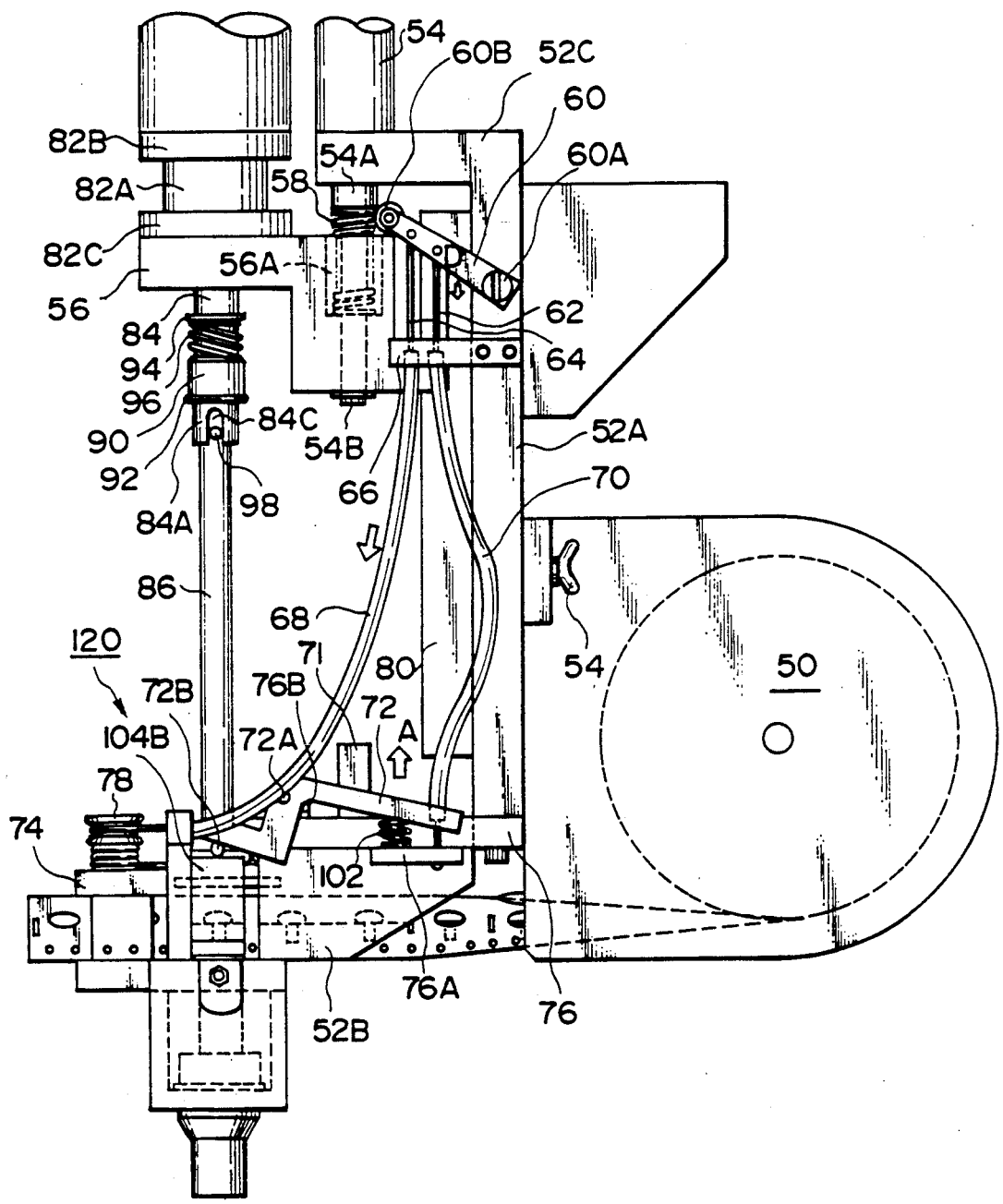
FIG. 6 shows the constructions of the essential portions of a fastening apparatus for carrying out a fastening method according to the present invention.

The state of FIG. 6 is a state in which the motor base 56 is positioned at the upper end of the guide 80. An operation signal for the air cylinder 54 is output from the controller 200, and by the lowering operation of the piston 54A, the motor base 56 is lowered along the guide plate 80. By the lowering of the motor base 56, the crank lever 60 is pivotably moved counter-clockwise about the fulcrum 60A. Thereby the wire 62 is moved in the direction of arrow D and therefore, the lever 72 is rotated counter-clockwise by the spring force of the spring 102. With the counter-clockwise rotation of the lever 72, the clamps 104A and 104B are pushed by the pins 72A and 72B on the branching-off portion of the lever 72 and are rotated about the pins 106 in a direction to nip the tape. With the rotation of the crank lever 60, the pulley 78 coupled to the other wire 64 is rotated by the spring force of the coil spring 124, but the sprocket 130 is not rotated by the one-way clutch 128 and the tape is not fed. By the movement of the clamps 104A and 104B in the closing direction by the lever 72, the tape is nipped between the clamps 104A and 104B. Thereby the axes of the shaft portions of the screws in the tape are kept in a direction coincident with the axis of the bit. Subsequently to the operation of the air cylinder 54, a driving signal is sent from the controller 200 to a drive circuit 200B for the motor $M_1$ to thereby rotate the shaft 84 of the motor $M_1$.

(b) The coupling of the bit to the screw will be described with reference to FIGS. 12A–12E.

By the lowering of the motor base 56 and the rotation of the motor shaft 84, the bit 86 is lowered while being rotated, and the lower end of the bit 86 comes into contact with the head of the screw. A groove for meshing with the bit is formed in the head of the screw, and the bit must be further lowered until it meshes with the screw. The motor base is further lowered for the meshing engagement of the bit with the screw (FIG. 12A).

The motor shaft 84 is lowered against the spring force of the spring 88 and as shown in FIG. 12B, the coupling of the bit to the screw is effected before the head of the bit 86 abuts against the level difference portion between the small-diameter bore and the large-diameter bore of the motor shaft. When the coupling of the bit to the screw is effected, the bit is further lowered by the motor base and separates the screw from the tape against the holding force of the tape holding the screw and the clamping forces of the clamps 104A and 104B clamping the tape (FIG. 12B). The screw separated from the tape by the lowering of the bit is pushed down into the catcher 112 by the bit.

The end of the shank portion of the screw is inserted into the resilient receiving portion 116 while being rotated (FIG. 12C), and the shoulder of the head of the screw abuts against the resilient receiving portion 116 (FIG. 12D). By the further lowering of the bit, the head of the screw passes through the resilient receiving portion 116 in such a manner as to widen the inside thereof, whereby the screw is fastened to a part, not shown (FIG. 12E). The fastening of the screw is detected as by the detection of the rotational torque of the bit.

(c) Feeding of the tape

After the completion of the fastening of the screw by the bit, the air cylinder 54 elevates the piston 54A, whereby the motor base 56 is also elevated. By the elevation of the motor base 56, the bit 86 is also elevated and the end of the bit 86 comes out of the catcher 112 and the tape. At the point of time whereat the end of the bit has come out of the tape, contact between the motor base 56 and the roller 60B is brought about. Further, by the elevation of the motor base 56, the crank lever 60 starts to rotate counter-clockwise, whereby feeding of the tape is started. That is, by the counter-clockwise rotation of the crank lever 60, the wires 62 and 64 are pulled upwardly. By the wire 62 being pulled upwardly, the lever 72 is rotated clockwise against the spring force of the spring 102 and the pins 72A and 72B studded on the lever 72 separate from the clamps 104A and 104B, and the clamps 104A and 104B move in a direction to open about the shafts 106 and 106, thereby releasing the clamping of the tape.

Also, by the wire 64 being pulled upwardly, the pulley 78 is pulled by the wire 64 and is rotated and therefore, the shaft 122 rotates the sprocket 130 in a direction to permit rotation of the one-way clutch 128, thereby feeding the tape by an amount corresponding to a predetermined pitch.

The amount of rotation of the sprocket 130 corresponds to the pitch P at which the tape shown in FIG.

3 holds the screws, and by the rotation of this sprocket 130, the next screw is fed onto the axis of the bit.

Effect of the Invention

As described above, according to the present invention, when a fastening member such as a screw is held by a tape or a film and is to be supplied to the lowered position of the bit of the fastening apparatus, the tape is held in a predetermined posture during the meshing between the bit and the screw as the bit is lowered, and the fastening operation of the screw is effected with such held state being kept, whereby the separation of the screw from the tape can be accomplished accurately and further, the shank portion of the screw is moved downwardly with the screw and the bit being kept nipped by the tape so as to be guided by the tape and therefore, the screw is lowered with its posture being kept straight. Therefore, fastening of the screw is accomplished accurately.

Further, according to the present invention, the tape feeding means 120 is operated by the elevation of the motor base resulting from the upward return process of the bit and the pulling-up of the wire 64 by the clockwise rotation of the crank lever 60 and therefore, the operation cycle of the entire apparatus can be shortened.

Furthermore, according to the present invention, the shank portion of the screw may come into the resilient receiving member of the catcher 112 before the screw removed from the tape by the bit is released from its state nipped by the tape, whereby the screw removed from the tape can be prevented from being disengaged from the bit and falling downwardly and thus, idle fastening of the screw by the bit can be reliably prevented.

Figure 13:
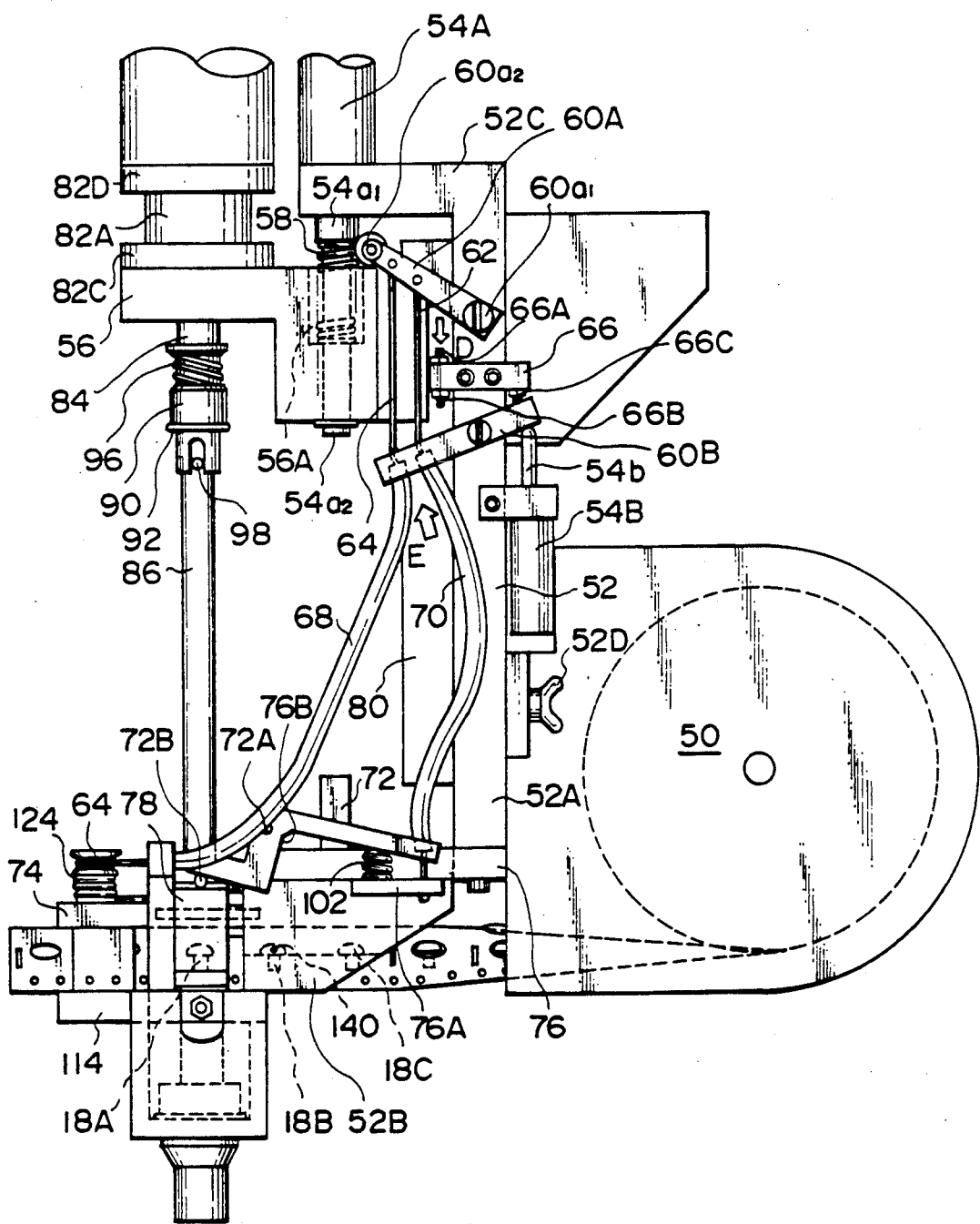
FIGS. 13 and 14 show another apparatus according to the present invention.
Figure 14:
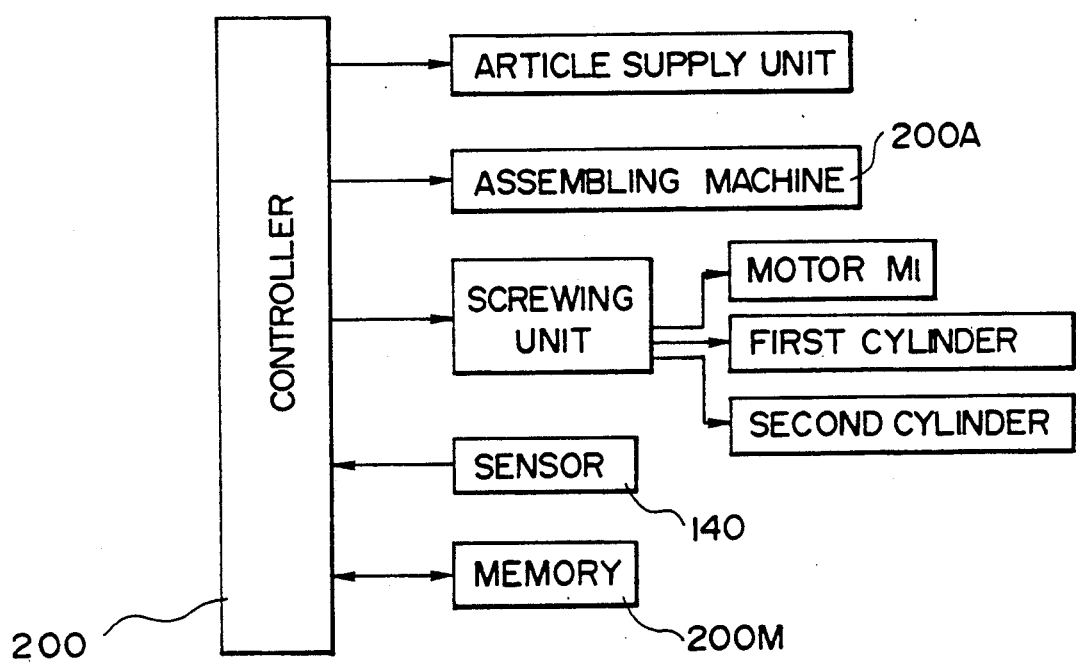

FIGS. 13 and 14 show a fastening apparatus provided with a countermeasure in a case where screws to be held on the tape are absent from the tape.

In the present embodiment, the presence of a screw before it comes to the screw fastening position of the bit is detected by detecting means and if the screw is absent, the tape is continuously fed.

The apparatus shown in FIG. 13 is similar in construction to the apparatus shown in FIG. 6 except for a second crank lever 60B, a second air cylinder 54B and a stopper member 66. The constructions of the portions differing from those of FIG. 6 will hereinafter be described with reference to FIG. 13.

The reference character 60A designates a first crank lever having one end 60a thereof rotatably supported on the vertical portion 52A of the frame and having a cam follower 60a₂ mounted on the other end thereof, the cam follower 60a₂ being engaged with the right upper end of the motor base plate 56 as viewed in FIG. 13. One end of each of two wires 62 and 64 is fixed to the first crank lever 60A.

The reference character 60B denotes a second crank lever supported on the vertical portion 52A of the frame. Outer cables 68 and 70 in which the wires 62 and 64 are inserted are fixed to one end of the second crank lever 60B, and the other end of the second crank lever 60B is engaged with the piston 54b of a second air cylinder 54B.

The second air cylinder 54B is mounted on the frame 52A. The reference numeral 66 designates a stopper member for the first and second crank levers 60A and 60B. The crank levers are stopped by striking against the stoppers 66A, 66B and 66C of the stopper member 66.

In the other points, the construction of FIG. 13 is the same as the construction of FIG. 6.

Sensor means 140 will now be described.

The reference numeral 140 designates a sensor for detecting the presence of screws on the tape. The sensor 140 comprises a light emitting element and a light receiving element mounted on the frame 52B, and detects the presence of the screw 18B next to the screw 18A to which the rotation and downward movement of the bit 86 are transmitted and which is in the bit fastening position (the position on the axis of the downward movement of the bit 86), among the screws indicated by dotted lines in FIG. 13.

Operation will now be described.

The structure of the bit, the clamp means 100, the tape feeding means, etc. are the same as those shown in FIGS. 7-10, and the operation of the bit is the same as described with reference to FIGS. 12A -12E. The operation beginning with the screw detection by the sensor 140 will hereinafter be described.

(a) The operation of detecting screws by the sensor 140

Prior to the screw fastening operation, an operation signal for the sensor 140 is output from the controller 200, and the operation of detecting the presence of a screw is performed. The state shown in FIG. 13 is a state in which the sensor 140 has detected the presence of the screw 18A in the previous process and the piston 54b of the second air cylinder 54B has been operated by the sensor signal and the second crank lever 60B has been rotated counter-clockwise and restrained by the stopper 66C.

(b) If the next screw 18B is present on the tape shown in FIG. 13, the step (b) of the holding the posture of the tape in the apparatus of FIG. 6 is carried out.

(c) Further, the operation of coupling the bit to the screw shown in FIGS. 12A-12E is performed.

(d) Subsequently, feeding of the tape is effected.

(e) A case where the next screw 18B is absent on the tape

In a case where the screw 18B to be fastened next is absent on the tape, the light from the light emitting element constituting the sensor 140 is received by the light receiving element, and the signal thereof is input to the controller 200. The controller 200 receives the screw-absence signal from the light receiving element and stores this signal into a memory 200M. In the meantime, fastening of the screw 18A lying at the fastening position is effected by the rotation and downward movement of the bit 86. With the elevation of the bit after the completion of the fastening of the screw 18A, the tape feeding means 120 is operated to feed the tape by one step. In this state, that portion of the tape in which the screw is absent comes to the screw fastening position of the bit. Subsequently, the screw-absence signal is called out from the controller 200 to the memory 200M, whereby an operation signal for the second air cylinder 54B for tape feeding is output. Thereby, a signal for returning the piston 54b of the second air cylinder 54B is output to rotate the second crank lever 60B clockwise until it strikes against the stopper 66B. By this clockwise rotation of the second crank lever 60B, the cables 64 and 70 are pulled up in the direction of arrow B, and tape holding is effected by the same action as the counter-clockwise rotation of the crank lever 60A during the operation of holding the posture of the tape mentioned under item (b) above, and the pulley 78 is rotated by the spring force of the spring 124.

This rotation of the pulley 78 is idle rotation which does not feed the tape. Subsequently, a command for operating the second air cylinder 54B is output from the controller 200 and the second piston 54b is extended to rotate the second crank lever 60B counter-clockwise. Thereby the outer cables 68 and 70 are pushed in the direction opposite to the direction of arrow E to bring about the state of FIG. 6, and the lever 72 releases the restraint of the clamp members 104A and 104B and thus, the clamping of the tape is released.

Then, the pulley 78 is rotated by the wire 64, whereby the sprocket is rotated and the tape is fed by one step and thus, the next screw 18C in the screw-absent portion is fed to the screw fastening position of the bit. When the next screw 18C in the screw-absent portion is held on the tape, the ordinary fastening operation for the screw 18C by the bit is effected.

As described above, in a supply device wherein a plurality of fastening members such as screws are held on a tape and the fastening members are fastened to an assembly by the bit of a screwing apparatus, the presence of a screw next to the screw to be separated from the tape by the bit and fastened is detected and when the next screw is absent, the tape is fed until the screw on the tape comes to the screw fastening position of the bit, whereby confirmation of the screw and the screwing operation can be continuously effected and the unnecessary idle screwing operation of the bit can be prevented when there is no screw on the tape.

We claim:

1. An article supplier for holding and supplying an article to a supply position, with the article to be supplied having a shaft and connected head member, said article supplier comprising:
   a tape body comprising first and second strips formed of a flexible material and superposed to each other, a plurality of securing portions formed at predetermined intervals in a longitudinal direction of said first and second strips for partially securing the superposed portions of said first and second strips together, with said tape body having article receiving holes between said securing portions for receiving the articles in a position transverse to the longitudinal direction of said first and second strips, said first and second strips each forming a wall for defining each article receiving hole and having an opening therein, wherein the article is supplied into the article receiving hole and the head member extends through and is supported by the openings in said first and second strips.

2. An article supplier according to claim 1, wherein each of the openings in said first and second strip have the same height.

3. An article supplier according to claim 1, wherein each article receiving hole is formed so that the opening in said first and second strip is gradually inclined toward the center of the hole.

4. An article supplier according to claim 3, wherein each of the openings in said first and second strip is formed in a substantially elliptical shape.

* * * * *

UNITED STATES PATENT AND TRADEMARK OFFICE
CERTIFICATE OF CORRECTION

PATENT NO. : 5,092,460

DATED : March 3, 1992

INVENTOR(S) : Osamu Satoh, et al.

It is certified that error appears in the above-identified patent and that said Letters Patent is hereby corrected as shown below:

On title page, item

[30] FOREIGN APPLICATION PRIORITY DATA:

"Feb. 29, 1988  [JP]  Japan  63-02491[U]
 Feb. 6, 1989   [JP]  Japan  1-12743" should read
 --Feb. 29, 1988  [JP]  Japan 63-24961[U]
 Feb. 6, 1989   [JP]  Japan  1-12743[U]--; and
 "Feb. 7, 1989  [JP]  Japan  1-27037" should read
 --Feb. 6, 1989  [JP]  Japan  1-27037--.

Column 1,

Line 23, "No. 512672." should read --No. 51-2672.--.

Signed and Sealed this

Twenty-fourth Day of August, 1993

*Attest:*

BRUCE LEHMAN

*Attesting Officer*   *Commissioner of Patents and Trademarks*